(12) United States Patent
Jibu et al.

(10) Patent No.: US 9,298,005 B2
(45) Date of Patent: Mar. 29, 2016

(54) SCANNING LENS AND OPTICAL SCANNER

(71) Applicant: BROTHER KOGYO KABUSHIKI KAISHA, Nagoya-Shi, Aichi-Ken (JP)

(72) Inventors: Yasuomi Jibu, Ichinomiya (JP); Junji Fujitani, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/099,528

(22) Filed: Dec. 6, 2013

(65) Prior Publication Data
US 2014/0160547 A1   Jun. 12, 2014

(30) Foreign Application Priority Data

Dec. 7, 2012   (JP) .................................. 2012-268001

(51) Int. Cl.
G02B 26/08    (2006.01)
G02B 26/12    (2006.01)
G02B 13/00    (2006.01)

(52) U.S. Cl.
CPC .......... G02B 26/125 (2013.01); G02B 13/0005 (2013.01)

(58) Field of Classification Search
CPC ........ G02B 26/10; G02B 7/02; G02B 26/123; G02B 26/125; B41J 2/44; B41J 2/442
USPC .................. 359/201.1, 212.2, 206.1
See application file for complete search history.

(56) References Cited

U.S. PATENT DOCUMENTS

| 7,301,685 B2 * | 11/2007 | Andoh et al. .............. 359/201.1 |
| 8,345,355 B2 | 1/2013 | Jibu et al. |
| 2010/0098798 A1 | 4/2010 | Andoh et al. |
| 2011/0242671 A1 | 10/2011 | Jibu et al. |

FOREIGN PATENT DOCUMENTS

| JP | 10-268222 A | 10/1998 |
| JP | 2002-98921 A | 4/2002 |
| JP | 2004-318024 A | 11/2004 |
| JP | 2005-99819 A | 4/2005 |
| JP | 2008-241817 A | 10/2008 |
| JP | 2009-58882 A | 3/2009 |
| JP | 2011-215281 A | 10/2011 |
| JP | 2001-324692 A | 11/2011 |

OTHER PUBLICATIONS

Notification of the Second Office Action issued in corresponding Chinese Patent Application No. 201310656825.4, Jul. 23, 2015, together with English translation (14 pages).
Notification of Reason(s) for Refusal issued in Japanese counterpart application No. 2012-268001, Dec. 15, 2015.

* cited by examiner

*Primary Examiner* — Euncha Cherry
(74) *Attorney, Agent, or Firm* — Merchant & Gould PC

(57) ABSTRACT

A scanning lens molded of resin includes: a lens portion having an elongate shape extending in a main scanning direction and having first and second longitudinal ends located opposite to and away from each other in the main scanning direction; and a flange portion extending outward in the main scanning direction from the first longitudinal end of the lens portion. The scanning lens has first and second sides located opposite to and away from each other in a sub-scanning direction, and a first protrusion is provided on the first side to protrude outward in the sub-scanning direction. The flange portion protrudes farther beyond the first longitudinal end in an optical axis direction of the lens portion. As viewed from the sub-scanning direction, the first protrusion is located at a position overlapping an interface between the lens portion and the flange portion.

10 Claims, 7 Drawing Sheets

SCANNING LENS AND OPTICAL SCANNER

CROSS-REFERENCE TO RELATED APPLICATION(S)

This application claims priority from Japanese Patent Application No. 2012-268001 filed on Dec. 7, 2012, the disclosure of which is incorporated herein by reference in its entirety.

TECHNICAL FIELD

The present invention relates to a scanning lens molded of resin and an optical scanner including this scanning lens.

BACKGROUND ART

As a scanning lens molded of resin and used, for example, in an optical scanner of a laser printer, there is known a scanning lens which includes a lens portion having an elongate shape extending in a main scanning direction, and flange portions provided at both longitudinal ends of the lens portion.

In order to keep the strength of the flange portions, the flange portions may be configured to protrude in the optical axis direction of the scanning lens beyond the edge of the lens portion to increase the thickness in the optical axis direction. With this configuration, a recess portion is formed around an interface between the lens portion and each flange portion, and the cross-sectional area of the scanning lens becomes relatively smaller at this recess portion. This disadvantageously causes the liquidity of resin to be decreased around the interface when the resin is injected into a mold for the scanning lens, resulting in possible reduction in the moldability.

In view of the above, it would be desirable to improve the moldability of a scanning lens molded of resin.

SUMMARY OF THE INVENTION

According to one aspect of the present invention, there is provided a scanning lens molded of resin, which comprises: a lens portion having an elongate shape extending in a main scanning direction and having first and second longitudinal ends located opposite to and away from each other in the main scanning direction; and a flange portion extending outward in the main scanning direction from the first longitudinal end of the lens portion. The scanning lens has first and second sides located opposite to and away from each other in a sub-scanning direction, and a first protrusion is provided on the first side to protrude outward in the sub-scanning direction. The flange portion protrudes farther beyond the first longitudinal end in an optical axis direction of the lens portion. As viewed from the sub-scanning direction, the first protrusion is located at a position overlapping an interface between the lens portion and the flange portion.

According to another aspect of the present invention, there is provided an optical scanner which comprises: a light source configured to emit light; a light deflector configured to deflect light from the light source; the aforementioned scanning lens having a first protrusion; and the frame. In this optical scanner, the frame includes a contacting portion configured to contact the first positioning portion.

BRIEF DESCRIPTION OF THE DRAWINGS

To better understand the claimed invention, and to show how the same may be carried into effect, reference will now be made, by way of example only, to the accompanying drawings, in which:

FIGS. 6A and 6B are enlarged views of the scanning lens showing a longitudinal end remote from a gate portion of the scanning lens, in which FIG. 6A is a view as viewed from the first protrusion side, and FIG. 6B is a view as viewed from the beam-exit side; and FIGS. 7A and 7B are enlarged views of the scanning lens showing a longitudinal end closer to the gate portion, in which FIG. 7A is a view as viewed from the first protrusion side, and FIG. 7B is a view as viewed from the beam-exit side.

DESCRIPTION OF EMBODIMENT

A detailed description will be given of an illustrative embodiment of the present invention with reference to the accompanying drawings. In the following description, a main scanning direction indicates a scanning direction along which a laser beam scans a target surface to be scanned, such as a surface of a photoconductor drum, and is the same as a longitudinal direction of a scanning lens, whereas a sub-scanning direction is a direction orthogonal to both the main scanning direction and an optical axis direction of the scanning lens.

A general configuration of an optical scanner, to which a scanning lens according to the present invention is attached, will be described.

Figure 1:
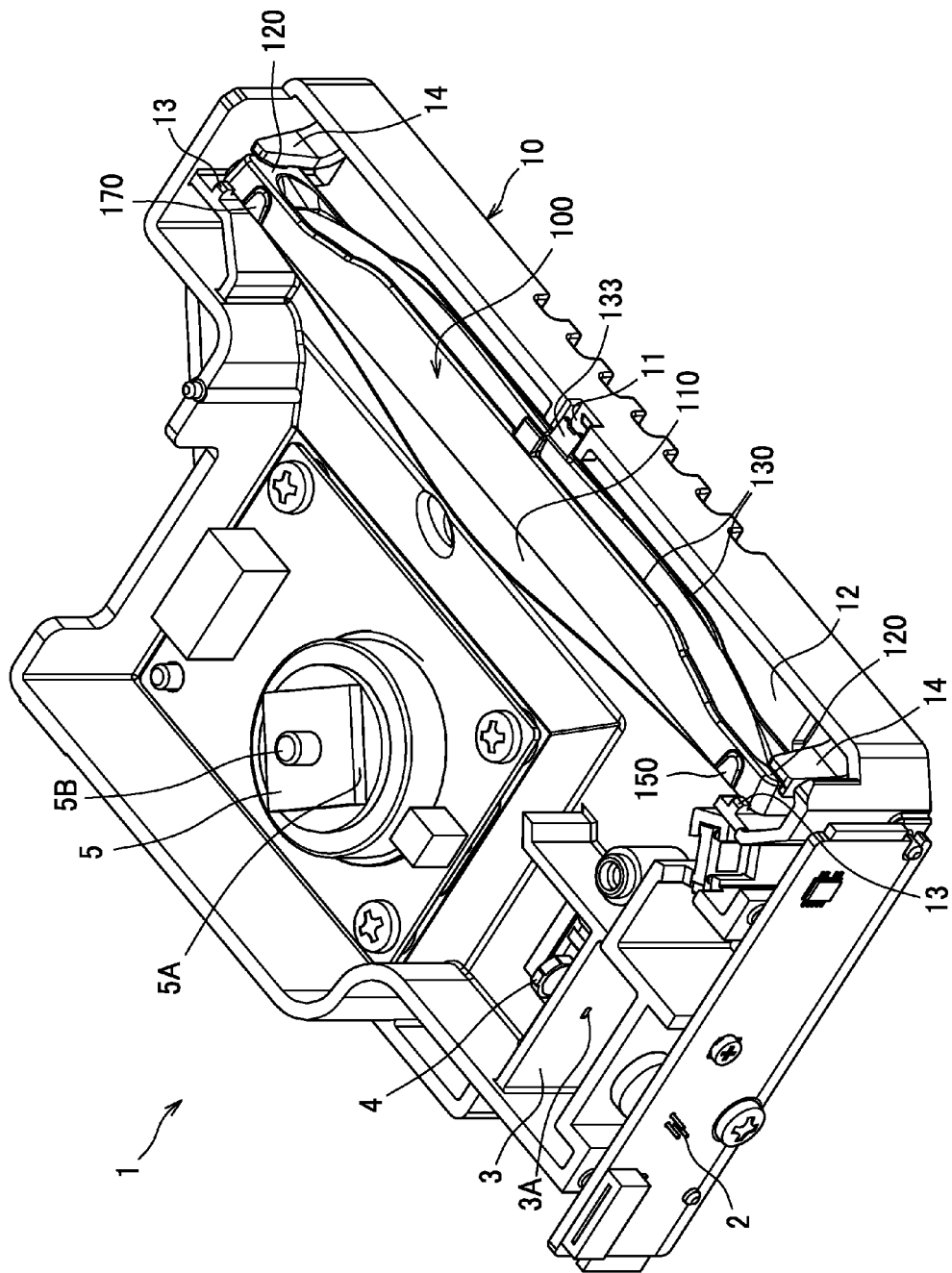
FIG. 1 is a perspective view schematically showing an optical scanner according to one exemplary embodiment of the present invention.

As seen in FIG. 1, an optical scanner 1 according to one embodiment of the present invention mainly includes a semiconductor laser 2 as an example of a light source, an aperture stop 3, a coupling lens 4, a polygon mirror 5 as an example of a light deflector, a scanning lens 100, and a frame 10 to which various optical elements such as the scanning lens 100 are attached. The optical scanner 1 is configured to convert a laser beam emitted from the semiconductor laser 2 into a dotted image and focus it on a target surface to be scanned (not shown) while scanning the target surface with the laser beam.

The semiconductor laser 2 is a known element for emitting a laser beam.

The aperture stop 3 is provided as a wall having an opening 3A, and the wall is provided inside the frame 10. In this embodiment, the aperture stop 3 is integral with the frame 10. The aperture stop 3 is configured to determine in the main scanning direction and in the sub-scanning direction the width of the laser beam emitted from the semiconductor laser 2.

The coupling lens 4 is configured to convert the laser beam having passed through the aperture stop 3 into a ray bundle substantially parallel to the main scanning direction, and to focus it in the sub-scanning direction on a mirror surface 5A of the polygon mirror 5.

The polygon mirror 5 includes four mirror surfaces 5A disposed equidistantly from an axis of rotation 5B. The polygon mirror 5 spins at a constant rotational speed around the axis of rotation 5B and reflects and thus deflect the laser beam having passed through the coupling lens 4 in the main scanning direction.

The scanning lens 100 allows the laser beam having deflected by the polygon mirror 5 to pass therethrough. The scanning lens 100 is configured to convert the laser beam into a dotted image and focus it on the target surface (not shown) as well as to correct an optical face tangle error of the mirror surfaces 5A of the polygon mirror 5. The scanning lens 100 has f-theta characteristics such that the laser beam deflected at a constant angular velocity by the polygon mirror 5 is converted into a laser beam that scans the target surface at a constant linear velocity.

Next, the scanning lens 100 which constitutes a characteristic part of the present invention will be described in detail.

Figure 2:
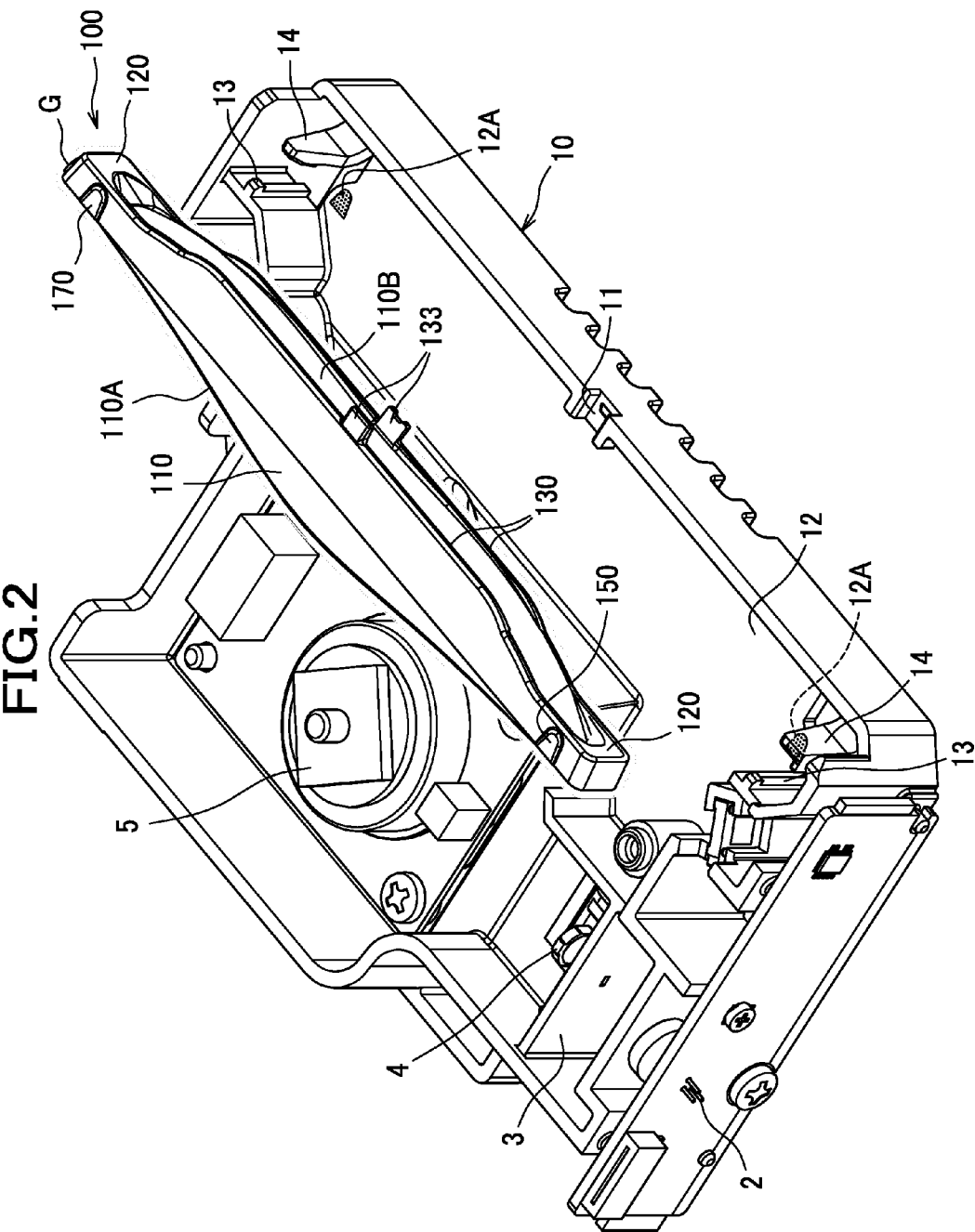
FIG. 2 is a perspective view of FIG. 1 with a scanning lens removed from a frame of the optical scanner.
Figure 3:
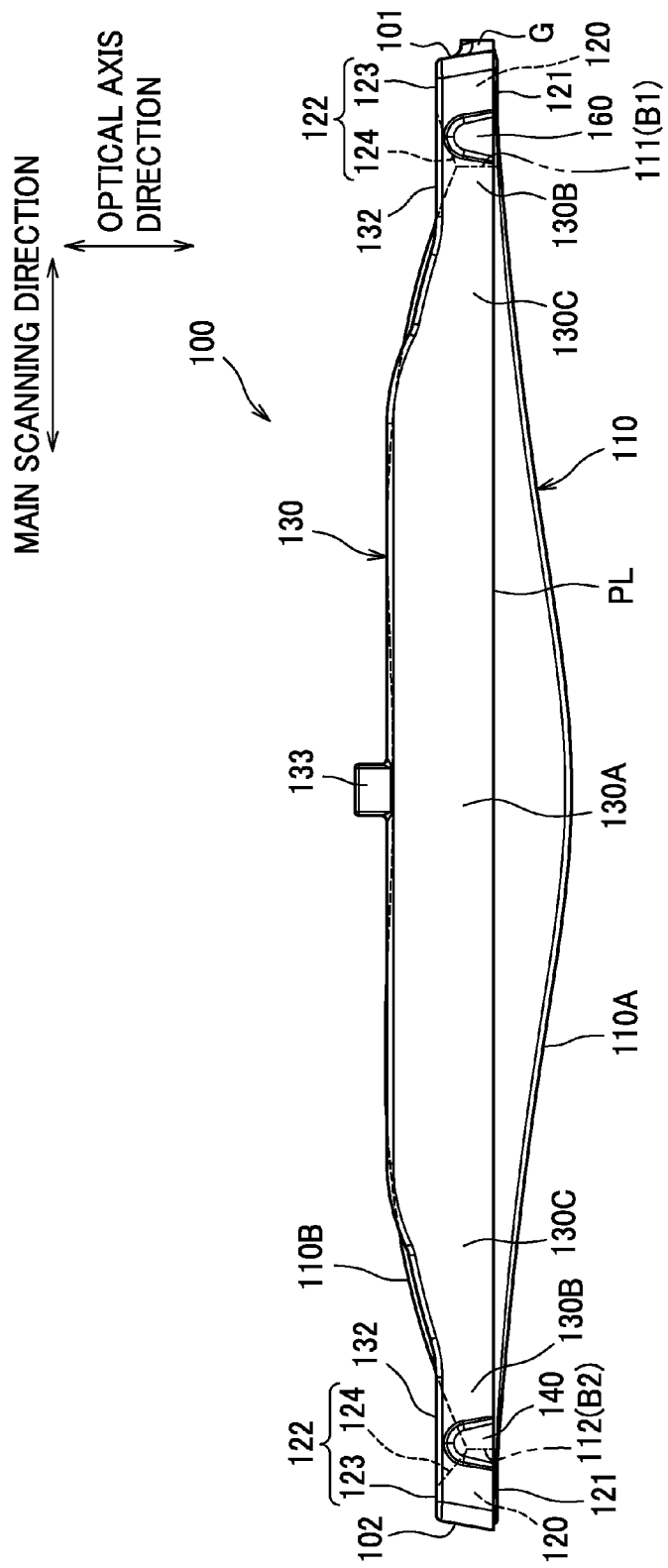
FIG. 3 shows the scanning lens as viewed from a first protrusion side.

The scanning lens 100 shown in FIG. 2 is formed by injecting a molten resin into a mold having a cavity corresponding to the contour of the scanning lens 100, and thereafter curing the molten resin. Although the scanning lens 100 is formed by injection molding, the present invention is not limited to this specific method, and any known methods may be used. As seen in FIG. 3, the scanning lens 100 formed by injection molding has a parting line PL linearly extending in the main scanning direction. Further, the scanning lens 100 has two longitudinal end faces 101, 102 located opposite to and away from each other in the main scanning direction, and one end face 101 has a gate portion G as a gate mark, for example, in the shape of a projection.

As seen in FIGS. 2 and 3, the scanning lens 100 mainly includes a lens portion 110, a pair of flange portions 120, a pair of rib portions 130, a first protrusion 140, a second protrusion 150, a third protrusion 160, and a fourth protrusion 170. FIG. 3 shows the scanning lens 100 of FIG. 2 as viewed from below.

Figure 4:
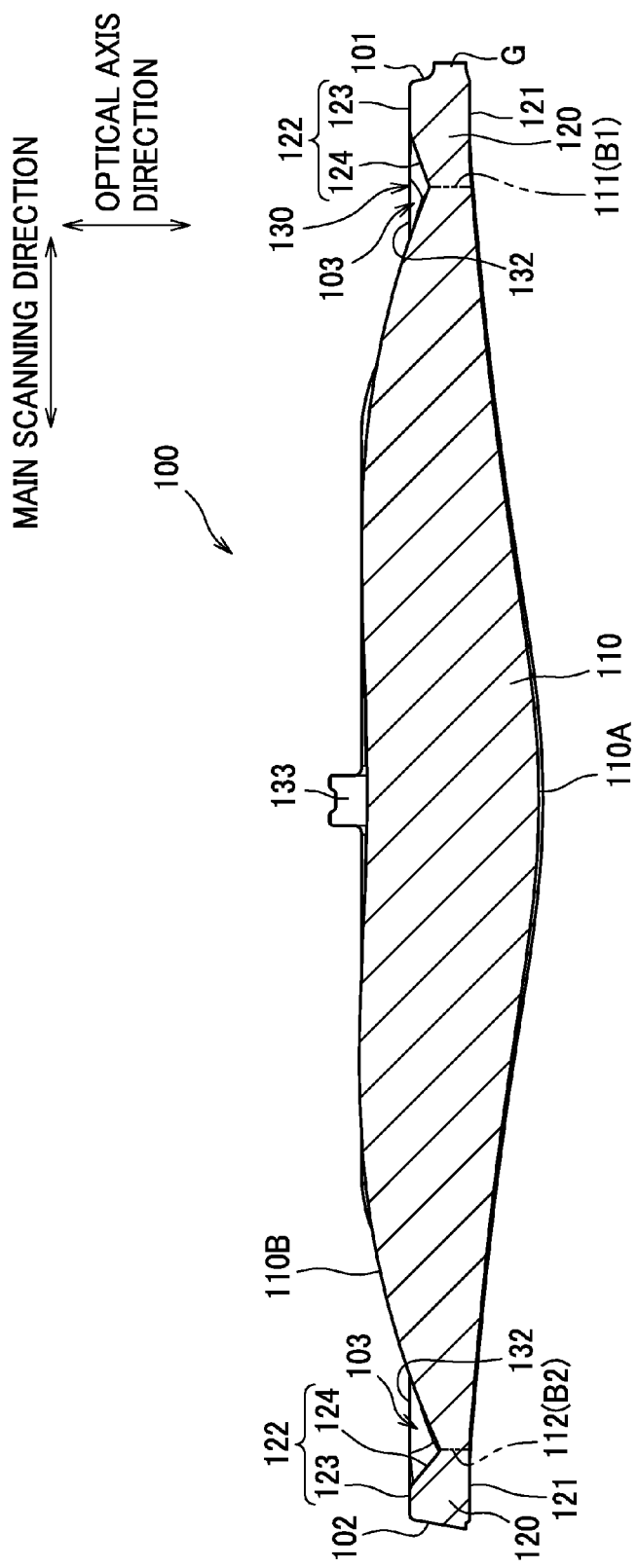
FIG. 4 is a sectional view of the scanning lens taken in a plane orthogonal to the sub-scanning direction.

As best seen in FIGS. 3 and 4, the lens portion 110 has an elongate shape extending in the main scanning direction, and includes a lens surface 110A on which the laser beam is incident, and a lens surface 110B from which the laser beam exits. The lens portion 110 has both longitudinal ends 111, 112 located opposite to and away from each other in the main scanning direction. The thickness of the lens portion 110 in the optical axis direction is thicker at its center portion than at its longitudinal ends 111, 112, and is gradually reduced with distance from the center portion to the longitudinal end 111, 112.

The flange portions 120 are provided at both longitudinal ends 111, 112 of the lens portion 110 such that they extend longitudinally outward (in the main scanning direction) from the longitudinal ends 111, 112 of the lens portion 110, that is a direction away from the center of the lens portion 110.

Of the surfaces of the flange portion 120 located opposite to and away from each other in the optical axis direction, an incident-side surface 121 as an incident-side of the laser beam is configured as a continuous surface with the lens surface 110A and extends toward the longitudinal end faces 101, 102 of the scanning lens 100. A portion of the incident-side surface 121 located outside the first protrusion 140 and the third protrusion 160 in the main scanning direction is formed as a flat surface orthogonal to the optical axis direction and functions as a second positioning portion. As seen in FIGS. 1 and 2, when the scanning lens 100 is attached to the frame 10, second positioning portions are brought into contact with a pair of ribs 13 provided inside the frame 10 so that the scanning lens 100 can be positioned in the optical axis direction with respect to the frame 10.

Returning now to FIGS. 3 and 4, an exit-side surface 122 as an exit-side of the laser beam includes a first surface 123 that is located at a position shifted from the longitudinal end 111, 112 of the lens portion 110 in the optical axis direction, and a second surface 124 configured to connect the first surface 123 to the longitudinal end 111, 112. In other words, each flange portion 120 protrudes farther beyond the longitudinal end 111, 112 in the optical axis direction. Accordingly, a recess portion 103 having a reduced thickness in the optical axis direction is formed in the scanning lens 100 at a position around an interface B1, B2 between the lens portion 110 and the flange portion 120. Further, the first surface 123 of the exit-side surface 122 is formed as a flat surface orthogonal to the optical axis direction, whereas the second surface 124 of the exit-side surface 122 is formed as a slanted surface inclined with respect to the optical axis direction.

As seen in FIGS. 1 and 2, a pair of ribs 13 are provided at both ends of the frame 10 at positions corresponding to both longitudinal end portions of the scanning lens 100. The ribs 13 function as a reference position in the optical axis direction when attaching the scanning lens 100 to the frame 10. Further, plate-like resin springs 14 are provided at positions opposite to the ribs 13. When the scanning lens 100 is attached to the frame 10 with the flange portions 120 inserted between the ribs 13 and the resin springs 14, the first surfaces 123 are urged by the resin springs 14, so that the scanning lens 100 is supported on the frame 10 while the incident-side surfaces 121 are pressed against the ribs 13. According to this embodiment, since the first surfaces 123 are flat surfaces orthogonal to the optical axis direction, the resin springs 14 can urge the flange portions 120 stably toward the ribs 13.

Figure 5:
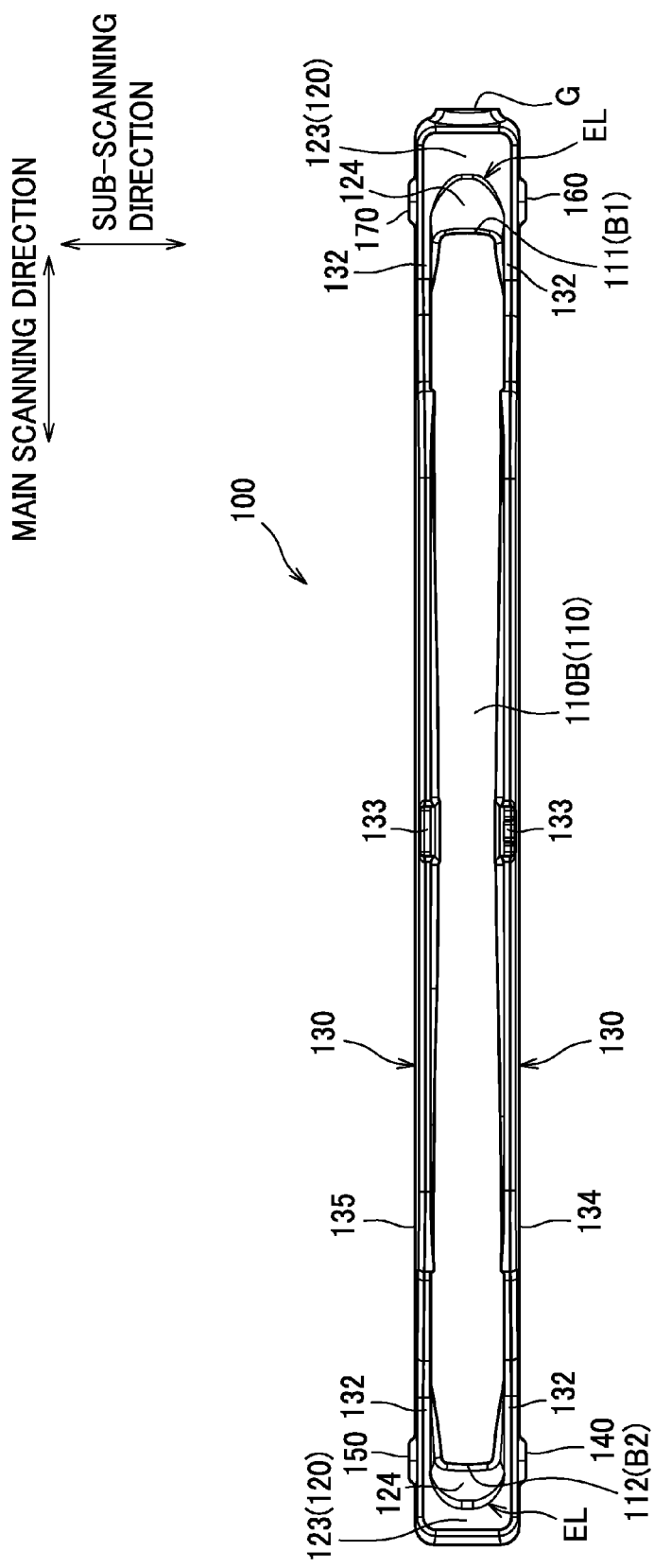
FIG. 5 shows the scanning lens as viewed from a beam-exit side of the scanning lens from which a laser beam exits.

As seen in FIGS. 3 and 5, a pair of rib portions 130 are formed at both sides of the lens portion 110 and the flange portions 120, and extend in the main scanning direction so as to cover the interfaces B1, B2 between the lens portion 110 and both flange portions 120; the pair of rib portions 130 are located opposite to and away from each other in the sub-scanning direction. To be more specific, as viewed from the sub-scanning direction, each rib portion 130 includes a widened portion 130A which constitutes a center part in the main scanning direction, narrowing portions 130B which constitute both side portions in the main scanning direction, and connecting portions 130C each connecting the widened portion 130A and the narrowing portion 130B.

Each narrowing portion 130B protrudes in the optical axis direction beyond the bottom of the recess portion 103 (see FIG. 4) which is formed by the lens portion 110 and the flange portion 120. A third surface 132, which constitutes an exit-side surface of the narrowing portion 130B from which the laser beam exits, is formed as a surface flush with the first surface 123 of the flange portion 120.

A projection 133 is formed on the widened portion 130A of each rib portion 130, at its center in the main scanning direction; the projection 133 sticks out in the optical axial direction from the widened portion 130A. As best seen in FIGS. 1 and 2, when the scanning lens 100 is attached to the frame 10, one of these projections 133 is engaged in a receiving portion 11 of the frame 10, thereby functioning as a positioning portion for positioning the scanning lens 100 in the main scanning direction with respect to the frame 10.

Figure 6A:
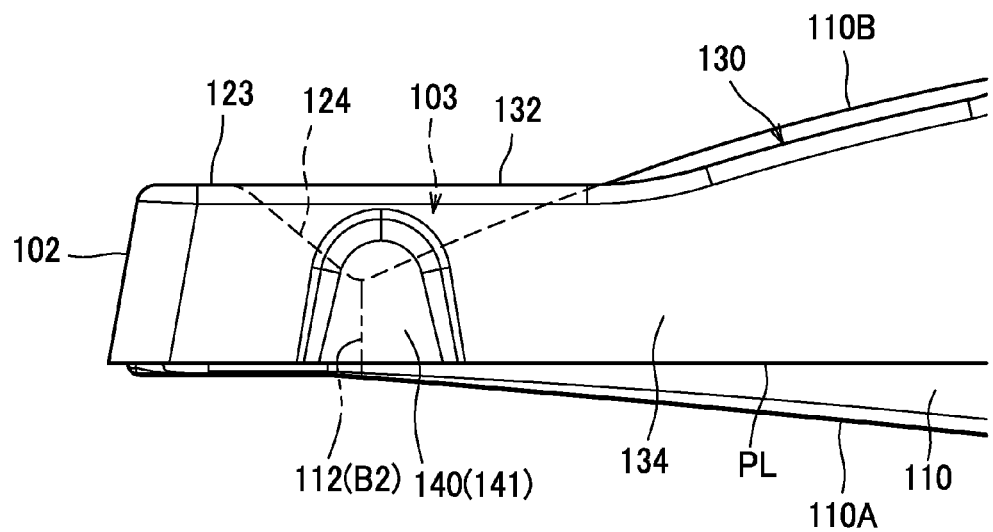
Figure 6B:
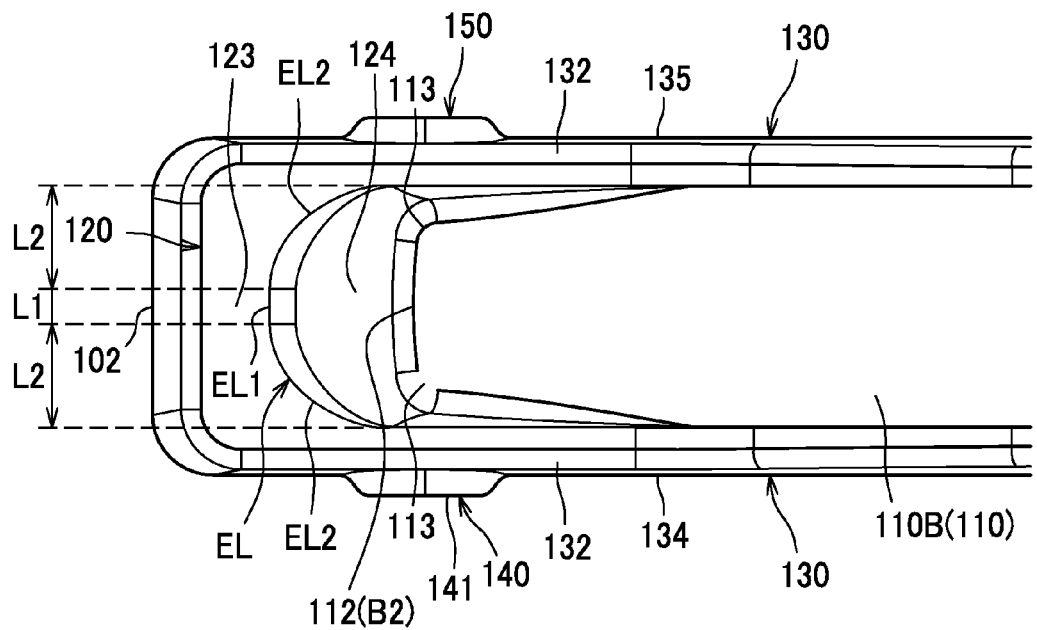
Figure 7A:
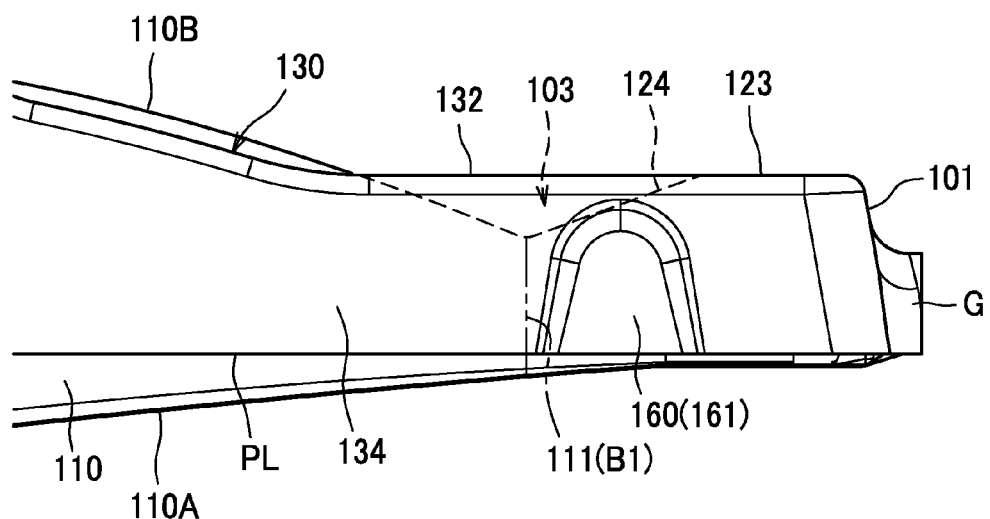
Figure 7B:
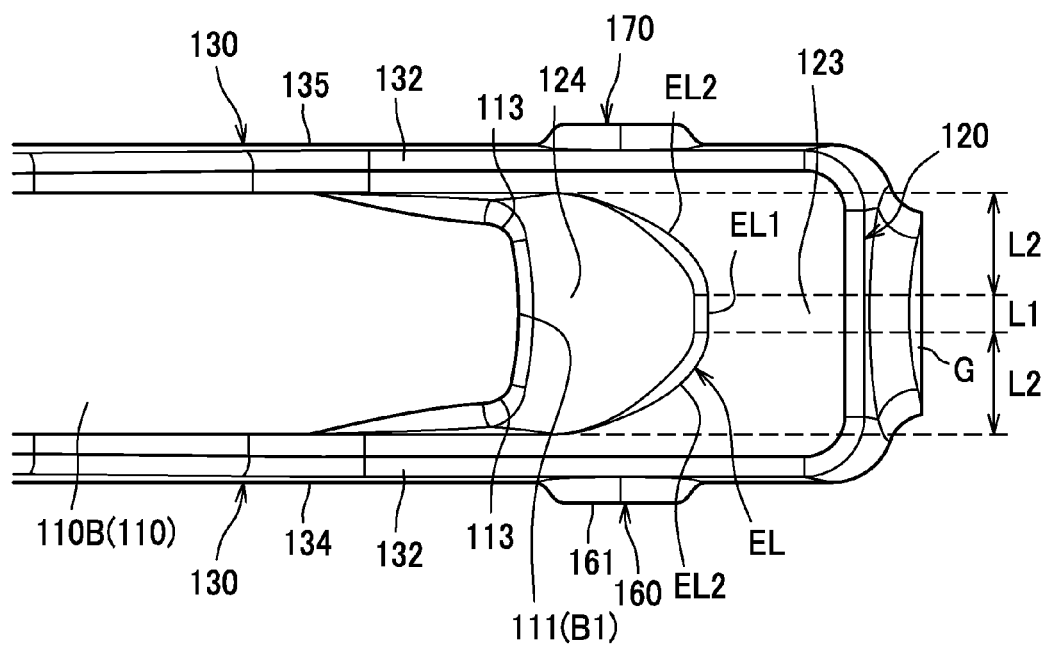

As seen in FIGS. 6B and 7B, and as viewed from the optical axis direction, an edge line EL defined by the first surface 123 and the second surface 124 of each flange portion 120 curves outward in the main scanning direction to form an outwardly protruding curve line as a whole, and is connected to inner edges of the rib portion 130 which are located opposite to and away from each other in the sub-scanning direction. To be more specific, in this embodiment, the edge line EL mainly includes a straight portion EL1 located at the center part in the sub-scanning direction and extending substantially straight along the sub-scanning direction, and curved portions EL2 extending from both ends of the straight portion EL1 such that they curve to be connected to the inner edges of the rib portion 130. In this embodiment, the edge line EL defined by the first surface 123 and the second surface 124 is configured such that the curved portion thereof has a radius of curvature greater than that of a corner portion made by normally molding the scanning lens; for example, the edge line EL in this embodiment satisfies L1<L2, where L1 represents the length of the straight portion EL1 in the sub-scanning direction, and L2 represents the length of the curved portion EL2 in the sub-scanning direction.

The curved shape of the curved portion EL2 is different from that of a corner portion 113 formed on the longitudinal end 111, 112 of the lens portion 110. To be more specific, the curved portion EL2 curves more gently than the corner portion 113 of the longitudinal end 111, 112 does. Both ends of the second surface 124 opposing to each other in the sub-scanning direction are configured to connect the first surface 123 and the longitudinal end 111, 112 such that the curved shape thereof gradually conforms to that of the corner portions 113 with distance from the curved portions EL2 toward the corner portions 113.

As seen in FIG. 5, the first protrusion 140 and the third protrusion 160 are configured to protrude outward in the sub-scanning direction (i.e., in a downward direction in the figure) from a first side of the scanning lens 100 located at one side in the sub-scanning direction (i.e., from a side surface 134 of one rib portion 130). Further, the second protrusion 150 and the fourth protrusion 170 are configured to protrude outward in the sub-scanning direction (i.e., in an upward direction in the figure) from a second side of the scanning lens 100, which is located opposite to the first side (i.e., from a side surface 135 of the other rib portion 130).

To be more specific, as seen in FIGS. 6A and 6B, the first protrusion 140 is located, as viewed from the sub-scanning direction, at a position overlapping both the interface B2 between the lens portion 110 and the flange portion 120 as well as the recess portion 103 formed by the lens portion 110 and the flange portion 120. Meanwhile, the second protrusion 150 is located at a position symmetrical to the first protrusion 140 across the interface B2 and shaped to have a symmetrical shape with respect to the first protrusion 140.

Further, as seen in FIGS. 7A and 7B, the third protrusion 160 is located, as viewed from the sub-scanning direction, at a position outward in the main scanning direction from the interface B1 between the lens portion 110 and the flange portion 120 and adjacent to the interface B1. Meanwhile, the fourth protrusion 170 is located at a position symmetrical to the third protrusion 160 across the flange portion 120 and shaped to have a symmetrical shape with respect to the third protrusion 160.

The first protrusion 140 and the third protrusion 160 are located symmetrically with respect to a line connecting the center of the lens surface 110A and the center of the lens surface 110B, and the second protrusion 150 and the fourth protrusion 170 are located symmetrical with respect to this line.

As best seen in FIGS. 6A and 7A, each of the first protrusion 140, the second protrusion 150, the third protrusion 160 and the fourth protrusion 170 is configured to have a substantially triangle shape such that the width thereof in the main scanning direction gradually decreases with distance from the parting line PL in the optical axis direction. With this configuration, when the scanning lens 100 is molded and removed from the mold, these projections 140, 150, 160, 170 provide little resistance and the scanning lens 100 can be readily removed from the mold. This can improve the productivity of the scanning lens 100.

Each of the first protrusion 140, the second protrusion 150, the third protrusion 160 and the fourth protrusion 170 is configured such that an outer surface thereof located outward in the sub-scanning direction is formed as a surface orthogonal to the sub-scanning direction. The outer surfaces 141, 161 of the first protrusion 140 and the third protrusion 160 are examples of the first positioning portions. As seen in FIGS. 1 and 2, when the scanning lens 100 is attached to the frame 10, these outer surfaces 141, 161 are brought into contact with corresponding contacting portions 12A provided on a bottom wall 12 of the frame 10, thereby functioning as positioning portions for positioning the scanning lens 100 in the sub-scanning direction with respect to the frame 10.

With the configuration of the scanning lens 100 described in this embodiment, the following advantageous effects can be achieved.

According to this scanning lens 100, since the recess portion 103 is formed around the interface B2 between the lens portion 110 and the flange portion 120, the thickness of the scanning lens 100 in the optical axis direction becomes smaller at the recess portion 103. However, providing the first protrusion 140 and the rib portion 130 at a position around the interface B2 makes it possible to increase the cross-sectional area of the scanning lens 100 around the interface B2, as compared to the configuration in which the first protrusion 140 and the rib portion 130 are not provided. In other words, the scanning lens 100 is configured to prevent an abrupt decrease in the cross-sectional area around the interface B2 with respect to the cross-sectional area of the flange portion 120. This can improve the liquidity of resin at a position around the interface B2 when the resin is injected into the mold for the scanning lens 100, thereby resulting in improved moldability of the scanning lens 100.

In particular, according to this embodiment, the second protrusion 150 is provided opposite to the first protrusion 140, and each of the first and second protrusions 140, 150 is located at a position overlapping both the interface B2 and the recess portion 103, so that each of the protrusions 140, 150 becomes longer in the optical axis direction to thereby increase the cross-sectional area around the interface B2. Further, the first protrusion 140 and the second protrusion 150 are formed symmetrically in this embodiment, so that the resin flows substantially uniformly through the position around the interface B2 at both sides of the scanning lens 100 opposing to each other in the sub-scanning direction. Therefore, the liquidity of resin can be improved at the position around the interface B2, and thus the moldability of the scanning lens 100 can be improved further.

According to the configuration of the scanning lens 100 in which the thickness of the lens portion 110 in the optical axis direction is thicker at its center portion than at its longitudinal ends, it is necessary to increase the thickness to some extent at the longitudinal ends of the lens portion 110 in order to keep the liquidity of resin upon molding. However, in this embodiment, since the liquidity of resin can be improved at the position around the interface B2 (longitudinal end 112), it is not necessary to increase the thickness at the longitudinal end 112. In particular, the lens portion 110 according to this embodiment has the least (smallest) thickness at the longitudinal end 112 thereof. Accordingly, the size of the scanning lens 100 in the optical axis direction can be decreased as a whole.

Further, according to the configuration of the scanning lens 100 in which the gate portion G is formed at the longitudinal end 101 remote from the first protrusion 140, the pressure of resin to be injected through the gate lowers at a position around the interface B2 and the resin may not flow smoothly at this position. However, in this embodiment, the liquidity of resin can be improved at the position around the interface B2, with the result that the resin can flow smoothly from the longitudinal end 101 closer to the gate to the other longitudinal end 102.

Further, in this embodiment, since the first protrusion 140 formed on the scanning lens 100 at a position around the interface B2 has the outer surface 141 as a positioning portion, the outer surface 141 can be formed with high accuracy. This is because the cavity becomes narrower in the mold at a position around the interface B2 than at the flange portion 120, and the pressure of the resin increases at this narrow position upon molding to thereby restrain an occurrence of sink.

Further, in this embodiment, since the incident-side surface 121 as a positioning portion is provided at the flange portion 120, which is greater in thickness in the optical axis direction than the interface B1, B2 between the lens portion 110 and the flange portion 120 and thus has higher strength, deformation of the scanning lens 100 can be restrained when the scanning lens 100 is attached to the frame 10.

Further, since the scanning lens 100 is configured such that the edge line EL defined by the first surface 123 and the second surface 124 curves outward in the main scanning direction to form an outwardly protruding curve line, the corner portion formed by the flange portion 120 and the rib portion 130 is not angular, so that the cross-sectional shape of the scanning lens 100 changes gradually in the main scanning direction at a position around the corner portion. This makes it possible to improve the liquidity of resin at the position around the corner portion defined between the flange portion 120 and the rib portion 130 upon molding the scanning lens 100. As a result, imperfect molding of the scanning lens 100 can be restrained.

Further, since the first surface 123 of the flange portion 120 and the third surface 132 of the rib portion 130 are flush with each other without creating a stepped portion therebetween, the liquidity of resin flowing from the rib portion 130 to the flange portion 120 can be improved. As a result, imperfect molding of the scanning lens 100 can be further restrained.

Further, since the flange portion 120 provided with the gate portion G has the edge line EL which curves outward as described above, the liquidity of resin can be stabilized upon molding the scanning lens 100. When the resin is injected through the gate, the pressure of the resin increases at a position around the flange portion 120 having the gate portion G and thus flow turbulence is likely to occur at a position around the corner portion between the flange portion 120 and the rib portion 130. However, according to the scanning lens 100 in this embodiment, the cross-sectional shape of the scanning lens 100 changes gradually at the position around the corner portion between the flange portion 120 and the rib portion 130, so that the flow turbulence is not likely to occur.

On the other hand, since the flange portion 120 remote from the gate portion G has the edge line EL which curves outward as described above, the resin injected through the gate can flow smoothly toward the longitudinal end 102 located opposite to the gate portion G. The pressure of injected resin lowers at a position around the flange portion 120 remote from the gate portion G, and thus the resin does not flow as smooth as it flows through the flange portion 120 having the gate portion G. However, according to the scanning lens 100 in this embodiment, the cross-sectional shape of the scanning lens 100 changes gradually at the position around the corner portion between the flange portion 120 and the rib portion 130, so that the pressure of the injected resin is unlikely to decrease abruptly at the flange portion 120 remote from the gate portion G.

Further, in the flange portions 120 provided at both sides of the lens portion 110, each of the edge lines EL curves outward as described above. Accordingly, the resin injected through the gate can flow smoothly in the main scanning direction of the entire scanning lens 100.

Although an illustrative embodiment of the present invention have been described in detail, the present invention is not limited to this specific embodiment. It is to be understood that various changes and modifications, such as those described below, may be made without departing from the scope of the appended claims.

In the above embodiment, the first protrusion 140 is located at a position overlapping both the interface B2 between the lens portion 110 and the flange portion 120 as well as the recess portion 103 formed by the lens portion 110 and the flange portion 120. However, the present invention is not limited to this specific configuration. For example, the first protrusion may be located at a position overlapping only the interface between the lens portion and the flange portion.

In the above embodiment, the first protrusion 140 located at a position overlapping the interface between the lens portion 110 and the flange portion 120 is provided only at one of the two longitudinal end of the scanning lens 100 located in the main scanning direction. However, the present invention is not limited to this specific configuration. For example, the first protrusion according to the invention may be formed at both longitudinal ends of the scanning lens 100. To be more specific, the scanning lens 100 according to the above embodiment may be modified such that the third protrusion 160 is located at a position overlapping the interface B1.

In the above embodiment, the second protrusion 150 is provided opposite to the first protrusion 140. However, the present invention is not limited to this specific configuration. For example, the second protrusion may not be provided.

Specific configurations of the protrusions 140, 150, 160, 170 are not limited to those described in the above embodiment. For example, each protrusion may be shaped as a cylinder or a semi-cylinder.

In the above embodiment, the incident-side surface 121 of the flange portion 120 functions as a positioning portion for positioning the scanning lens 100 in the optical axis direction with respect to the frame 10. However, the present invention is not limited to this specific configuration. For example, the first surface 123 that is a surface orthogonal to the optical axis direction may function as a positioning portion. In this way, since the scanning lens has a positioning portion, the assembly of the scanning lens with the frame of the optical scanner can be performed with ease. Further, the scanning lens can be simplified as compared to the configuration in which a positioning portion is provided separately from the incident-side surface 121 or the first surface 123.

In the above embodiment, a pair of flange portions 120 are provided at both longitudinal ends 111, 112 of the lens portion 110. However, the present invention is not limited to this specific configuration. For example, one flange portion 120 may be provided at one longitudinal end of the lens portion. In the case in which the flange portion is provided at one longitudinal end of the lens portion, the gate portion may be formed at the longitudinal end where the flange portion is provided or at the longitudinal end where the flange portion is not provided.

Specific configuration of the rib portion 130 is not limited to that described in the above embodiment. For example, as viewed from the sub-scanning direction, the rib portion may completely cover the lens portion and the flange portions. Further, in the above embodiment, a pair of rib portions 130 are formed at both sides of the lens portion 110 and the flange portions 120, which are located opposite to each other in the sub-scanning direction (i.e., on both sides of the scanning lens 100 in the sub-scanning direction). However, the present invention is not limited to this specific configuration, and one rib portion may be formed on one side of the scanning lens 100 in the sub-scanning direction at a position around the interface between the lens portion and the flange portion. As an alternative, the scanning lens may not include a rib portion.

Specific configurations of the lens portion 110 and the flange portions 120 are not limited to those described in the above embodiment. For example, the first surface of the flange portion may be a curved surface.

In the above embodiment, the scanning lens 100 has the parting line PL extending in the main scanning direction and provided in the vicinity of the center of the lens portion 110 as viewed in the optical axis direction. However, the present invention is not limited to this specific configuration. According to the invention, the parting line may be formed at any position of the scanning lens 100; for example, the scanning lens may have a parting line at one end of the lens portion in the optical axis direction.

Further, in the above embodiment, the polygon mirror 5 includes four mirror surfaces 5A. However, the present invention is not limited to this specific configuration, and the polygon mirror 5 may include six mirror surfaces. Further, the polygon mirror 5 is exemplified in the above embodiment as an example of the light deflector. However, the present invention is not limited to this specific embodiment, and the light deflector may be a vibrating mirror having a reflecting surface which vibrates to deflect light. Further, in the above embodiment, the semiconductor laser 2 is exemplified as the light source. However, the present invention is not limited to this specific configuration, and any known devices other than the semiconductor laser may be used as the light source.

What is claimed is:

1. A scanning lens molded of resin comprising:
   a lens portion having an elongated shape extending longitudinally in a main scanning direction and having first and second longitudinal ends located opposite to and away from each other in a longitudinal direction of the lens portion; and
   a flange portion extending outward in the main scanning direction from the first longitudinal end of the lens portion,
   wherein the scanning lens has first and second sides located opposite to and away from each other in a sub-scanning direction, and a first protrusion is provided on the first side to protrude outward in the sub-scanning direction,
   wherein the flange portion protrudes farther beyond the first longitudinal end in an optical axis direction of the lens portion,
   wherein the scanning lens has a narrow portion, and wherein a length of the lens portion in the optical axis direction becomes gradually smaller toward the narrow portion at the first longitudinal end, and a length of the flange portion in the optical axis direction becomes gradually smaller toward the narrow portion at an end of the flange portion closer to the first longitudinal end, and
   wherein as viewed from the sub-scanning direction, the first protrusion is located at a position overlapping the narrow portion.

2. The scanning lens according to claim 1, wherein a thickness of the lens portion in the optical axis direction is greater at a center portion of the lens portion than at the first longitudinal end.

3. The scanning lens according to claim 1, further comprising a rib portion formed on at least one side of the narrow portion in the sub-scanning direction and extending in the main scanning direction,
   wherein the rib portion protrudes in the optical axis direction beyond the narrow portion.

4. The scanning lens according to claim 1, wherein the scanning lens has both ends located opposite to and away from each other in the main scanning direction, and a gate portion corresponding to a gate of a mold is formed at one of the both ends of the scanning lens remote from the first protrusion.

5. The scanning lens according to claim 1, wherein a second protrusion is formed on the second side of the scanning lens such that as viewed from the sub-scanning direction, the second protrusion protrudes outward in the sub-scanning direction from the position overlapping the narrow portion.

6. The scanning lens according to claim 5, wherein the first protrusion and the second protrusion are located symmetrically with respect to the narrow portion.

7. The scanning lens according to claim 1, further comprising a parting line extending in the main scanning direction,
   wherein the first protrusion is shaped such that a width thereof in the main scanning direction becomes gradually smaller with distance from the parting line in the optical axis direction.

8. The scanning lens according to claim 1, wherein the first protrusion has a first positioning portion configured to be brought into contact with a frame to which the scanning lens is to be attached, the first positioning portion being used for positioning the scanning lens in the sub-scanning direction with respect to the frame.

9. The scanning lens according to claim 8, further comprising a second positioning portion provided outside the first protrusion in the main scanning direction and configured to be brought into contact with the frame and to be used for positioning the scanning lens in the optical axis direction with respect to the frame.

10. An optical scanner comprising:
    a light source configured to emit light;
    a light deflector configured to deflect light from the light source;
    the scanning lens of claim 9; and
    the frame,
    wherein the frame includes a contacting portion configured to contact the first positioning portion.

* * * * *